E. FINCH.
Car Wheel.
No. 6,657.
Patented Aug. 21, 1849.
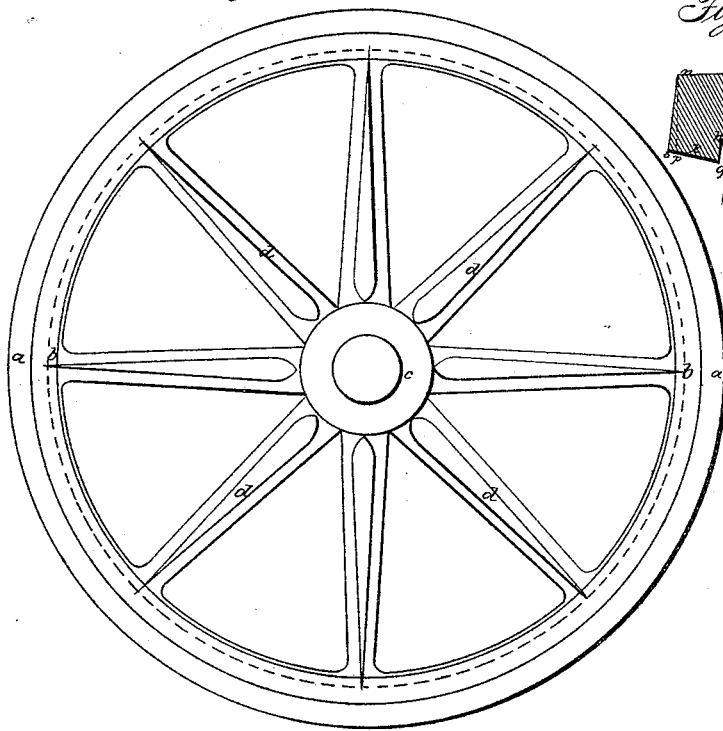
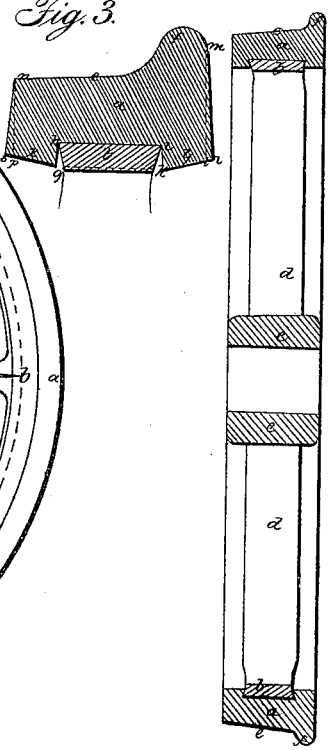
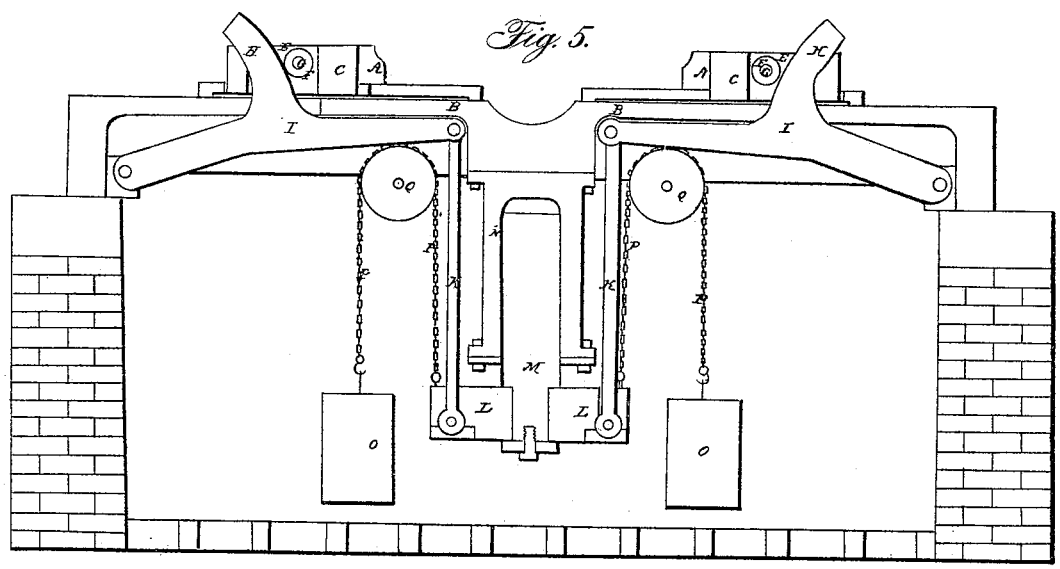

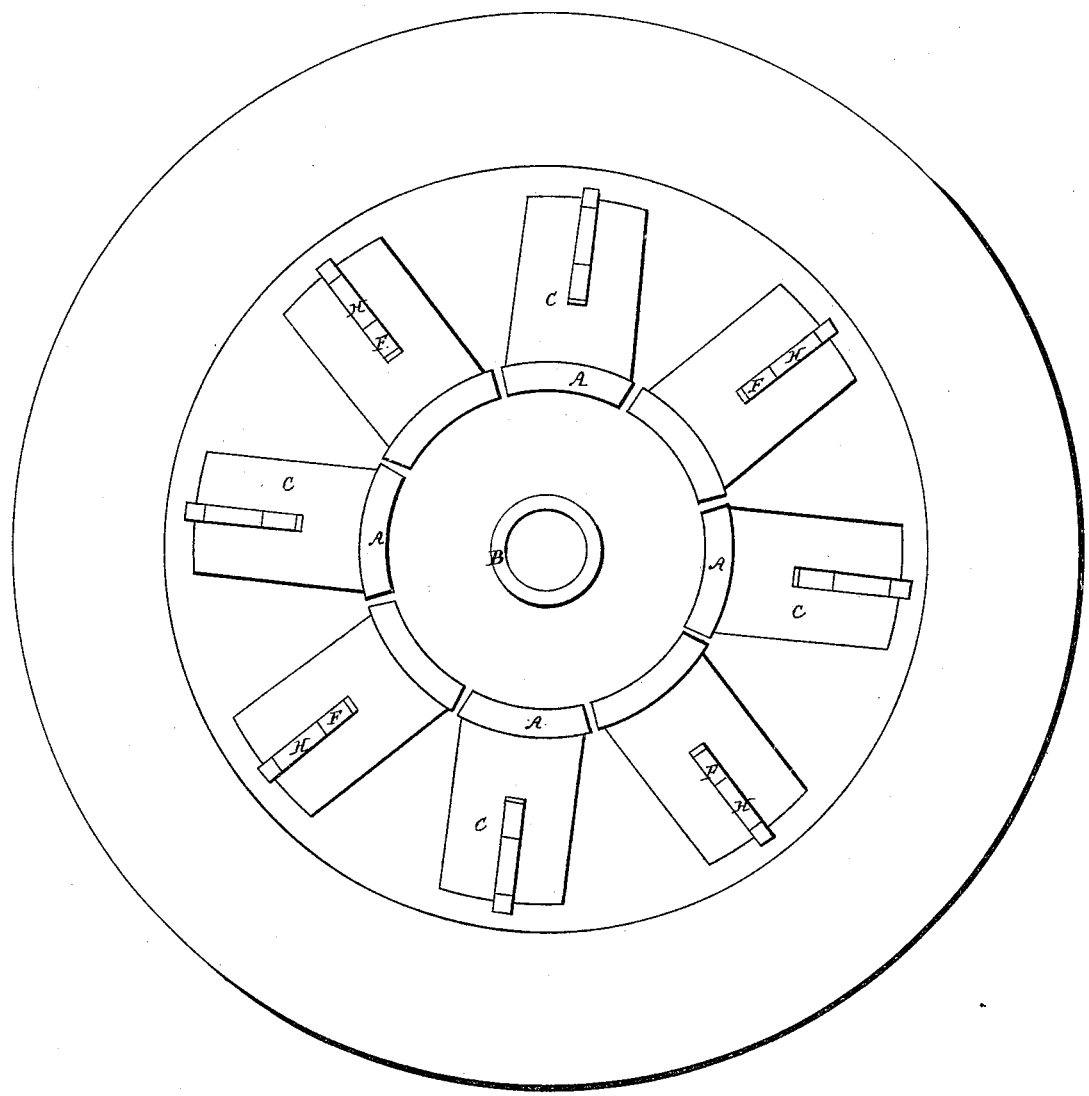

UNITED STATES PATENT OFFICE.

EDW. FINCH, OF LIVERPOOL, ENGLAND.

MANUFACTURE OF CAR-WHEELS.

Specification of Letters Patent No. 6,657, dated August 21, 1849.

*To all whom it may concern:*

Be it known that I, EDWARD FINCH, of Liverpool, in the Kingdom of Great Britain, have invented a new and useful Improvement in the Manufacture of Wrought-Iron Wheels for Railway-Carriages; and I do hereby declare that the same is fully described and represented in the following specification and accompanying drawings, letters, figures, and references thereof.

The wheel manufactured by me is represented in side elevation in Figure 1, and in transverse section in Fig. 2, of the aforementioned drawings. It consists of a wrought iron tread or outer tire *a*, a wrought iron inner felly or rim *b*, a hub *c*, made either of wrought iron, or cast iron, or other proper material, and a series of wrought iron spokes *d, d*, connecting the said hub and felly. The outer tire is connected to the felly or rim by what is usually termed a circular dovetail; that is to say the felly or rim is so made that its transverse section is in the form of a trapezoid as seen in Fig. 2, the outer tire having at the same time a recess in it corresponding in shape with that of the felly, and made to receive it as seen in Fig. 2.

The mode of making and connecting together the tire and felly is as follows: The felly and spokes are first made and connected together, the former being constructed dovetailing in cross section, and with its widest face outward. The tire which comprises the tread *e*, and flanch is made from a bar of wrought iron having a transverse section as represented at *a*, in Fig. 3, of the drawings. That is to say the said tire is constructed with a rectangular recess *g, h, i, k*, formed around and above its lower edge, the width *k i*, of which is equal to or a little greater than the extreme width of the dovetail of the felly. The sides of the tire may be made flaring instead of parallel to one another; that is to say they may be made as represented at *m l*, and at *n o*, in Fig. 3, instead of as exhibited by the dotted lines *m q*, and *n p*, in the said figure, which indicate the shape into which the sides are afterward to be brought in order to finish or complete the wheel. The tire so made when bent around into a circular form, should have its internal diameter equal to or a little greater than the external diameter of the dovetailed felly, in order that the said tire may be slipped over the felly, and made to inclose it. This being done the tire having been previously heated to a red heat, the whole is next to be subjected to the operation of a squeezing or compressing machine, such as is represented in Figs. 4, and 5, the former being a top view of the said machine, and the latter a transverse and central section of it.

The said compressing machine consists in part of a series of jaws or grippers A, A, A, &c., arranged in a circle about a common center, and upon a flat or bed plate B. The inner edge of each gripper is made in form to correspond with the shape of the external surface of the tire; and the several grippers are so made in other respects as to admit of their being respectively and simultaneously moved in a direction for a short distance, both toward and away from the said common center. When so disposed on the table or bed, and ready to receive a wheel between them, they should have their inner gripping surfaces arranged in a circle whose diameter is a little greater than the external diameter of the wheel tire to be subjected to their action. The said series of grippers should be provided with suitable machinery by which they may be simultaneously and with great power moved toward their common center, and in such manner as to compress or contract the rim of the wheel, and to such extent as to cause the dovetailed felly to fully enter its rectangular sectional space denoted by *g h i k*, in Fig. 3. In Fig. 4, each one of the grippers is shown as attached to a tail piece or block of metal C, through which a vertical slot E, is made, the said slot having a friction roller F, placed in it, and supported on a center pin G. Against the said roller a cam or curved arm H, extending upward from a lever I, operates; the rear face or edge of the said arm, being caused to bear against the rear or back part of the slot in order to produce the retreat of the gripper. The several levers I, I, &c., by means of connecting rods K, K, &c., are made to communicate with the piston head L, of the piston M, of a hydraulic cylinder N, connected to the bed plate B, as seen in Fig. 5. By means of water forced into the cylinder the piston is depressed and so actuates the mechanism connected with it, as to cause the grippers to approach one another and their common center. A reversed movement of the grippers is effected by weights O, O, respectively suspended to chains P, P, which pass around pulleys Q, Q, disposed as seen in Fig. 5.

The parts comprising the wheel being placed in the compressing machine, and so that the grippers or compressors may be properly brought to act against the tire, the said grippers are forced up and until the tire has been contracted fully down upon the dovetailed rim, and the latter made to enter the rectangular space intended to receive it. This being done the grippers are to be withdrawn, and the wheel subjected to a further action, which consists in bending the lips $x$, $y$, of the tire, down upon and against the dovetailed rim in such manner as to make the recess $g\ h\ i\ k$, trapezoidal in section, and corresponding with the shape of the dovetailed rim. This bending of the lips I effect by means of a large anvil or bed, and a powerful hammer placed over it, and made to act at once on the entire lip exposed to its blow. The wheel is placed on the anvil in such manner that one lip may rest on the bed or anvil. While the tire is still in a heated state, the hammer is raised and suffered to descend with a force of one or more blows sufficient to swedge or bend the lips down upon and in close contact with the flaring sides of the rim. Afterward the tire is suddenly cooled by being dipped into cold water.

The above described improvement in the mode of manufacturing railway car wheels of wrought iron, differs essentially from any heretofore practiced. The wheel produced is a very strong and durable one, and is especially calculated to bear a very high speed, and great strain, without liability of rupture. It presents advantages which cannot be found combined in any other wheel. The tire or external rim of the wheel being one entire piece of iron made to firmly grasp the rim of the spokes by a continuous and uninterrupted dovetail fastening as described, becomes so strongly connected to the rim that should a transverse fracture take place in it, it will be held firmly in place. After the fixation and cooling of the tire it contracts upon the rim, and thereby becomes more firmly bound thereto.

I am aware that it is nothing new to make a wheel in such manner that the tire may be connected to the rim by a dovetail, but in this instance the tire has not been made with two continuous or entire circular lips; one of the said lips being cut away or made with a passage or opening in it, through which the sections of the rim, (having the spokes connected to them,) were inserted one after the other: and when all were in place the said space has been covered or filled by a plate or piece of metal adapted thereto. In such a wheel there is no close conjoining of the tire and rim such as takes place in my wheel, and which is very material to its strength. Besides the rim in my wheel may be made in one entire piece, whereas in the other wheel above mentioned, it has to be constructed in separate pieces or sections. Consequently the sectional ring adds little to the strength or security of the tire in comparison to what it would if made in one entire piece as it can be in my wheel.

What I claim as my invention is—

The above described improvement in the manufacture of a wrought iron wheel for railway carriages; viz, by contracting or compressing the tire and its lips down upon a dovetailed rim while the tire is heated as specified; whereby the parts are united by a continuous dovetail joint as explained, thereby avoiding in the use of such a wheel many liabilities to accident to which other wrought iron wheels are subject.

In testimony whereof I have hereto set my signature this nineteenth day of April, A. D. 1849.

EDWARD FINCH.

Witnesses:
R. H. EDDY,
CALEB EDDY.